United States Patent [19]
Klomp

[11] Patent Number: 4,920,931
[45] Date of Patent: May 1, 1990

[54] TWO CYCLE ENGINE WITH VANED DIFFUSING EXHAUST PORT

[75] Inventor: Edward D. Klomp, Mt. Clemens, Mich.

[73] Assignee: General Motors Corporation, Detroit, Mich.

[21] Appl. No.: 369,381

[22] Filed: Jun. 21, 1989

[51] Int. Cl.$^5$ .............................................. F02B 75/02
[52] U.S. Cl. .............................. 123/65 PE; 123/323
[58] Field of Search ................. 123/65 P, 65 PE, 323, 123/65 EM, 65 R

[56] References Cited

U.S. PATENT DOCUMENTS

| | | | |
|---|---|---|---|
| 1,514,476 | 11/1924 | Still | 123/65 PE |
| 4,112,882 | 9/1978 | Tews | 123/73 AV |
| 4,121,552 | 10/1978 | Mithuo et al. | 123/65 PE |
| 4,651,686 | 3/1987 | Kania | 123/65 P |
| 4,660,514 | 4/1987 | Nerstrom | 123/65 PE |

FOREIGN PATENT DOCUMENTS

| | | | |
|---|---|---|---|
| 0025030 | 2/1984 | Japan | 123/65 PE |
| 0186908 | 8/1988 | Japan | 123/65 PE |
| 24551 | of 1915 | United Kingdom | 123/65 PE |

OTHER PUBLICATIONS

SAE Paper 871653—A Method of Separating Short-Circuit Gas from Exhaust Gas in a Two-Stroke Cycle Gasoline Engine (A Good Use of Exhaust Gas) Sep. 14, 1987.

Primary Examiner—David A. Okonsky
Attorney, Agent, or Firm—Robert J. Outland

[57] ABSTRACT

A two cycle engine is provided with a diffusing exhaust port which includes axially spaced separating vanes that divide the port into a plurality of axially spaced passages to more closely approach ideal diffusing exhaust flow during all degrees of exhaust port opening and thereby maximize the exhaust energy recovery during blowdown and the entire exhaust process. A timing valve may be used at the port outlet or elsewhere to block flow through the upper port passages and allow greater expansion of the combustion gas in the cylinder at part load while maintaining efficient energy recovery by diffusing flow in the open passages of the exhaust port.

4 Claims, 2 Drawing Sheets

TWO CYCLE ENGINE WITH VANED DIFFUSING EXHAUST PORT

TECHNICAL FIELD

This invention relates to two-stroke cycle engines, commonly and hereafter referred to as two cycle engines, and to cylinder exhaust ports for such engines.

BACKGROUND

It is known in the art relating to two cycle engines having cylinder exhaust ports that the blowdown of pressurized gas in a cylinder when the exhaust port opens produces a high velocity jet directed from the cylinder into the exhaust passage. Since only a small portion of the exhaust port is open during blowdown, the area available for exhaust flow is only a small fraction of the total exhaust port area. Thus, the energy in the high velocity jet is dissipated by a sudden expansion.

It is also known that various exhaust port valve devices have been proposed for varying the timing of the exhaust process.

The present invention was developed from my recognition that the dissipation of the exhaust blowdown energy represents a loss, some portion of which might be recoverable by appropriate changes in the exhaust port design. The potential value of incorporating means for varying exhaust blowdown timing was also considered.

SUMMARY OF THE INVENTION

This invention provides an exhaust port having a diffusing configuration which is divided by vanes into a plurality of diffusing exhaust passages adapted to recover part of the energy in the blowdown and subsequent flow of exhaust gas leaving the cylinder.

The invention also provides means for varying timing of the exhaust process in a vaned diffusing exhaust port.

These and other features and advantages of the invention will be more fully understood from the following description of certain specific embodiments of the invention taken together with the accompanying drawings.

BRIEF DRAWING DESCRIPTION

DETAILED DESCRIPTION

Figure 1:
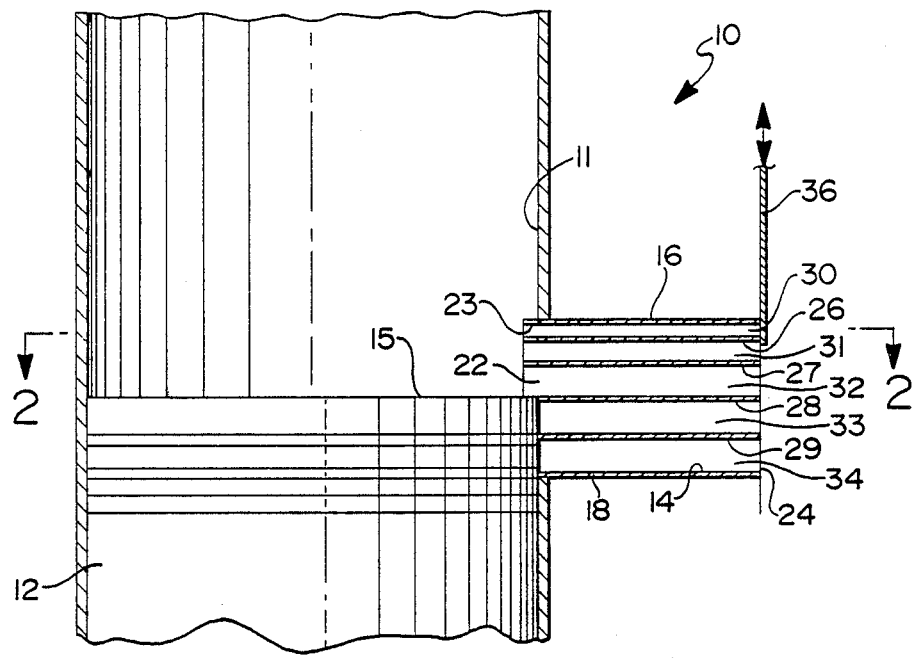
FIG. 1 is a schematic side view representing a two cycle engine cylinder and piston assembly having a vaned diffusing exhaust port and timing valve according to the invention.
Figure 2:
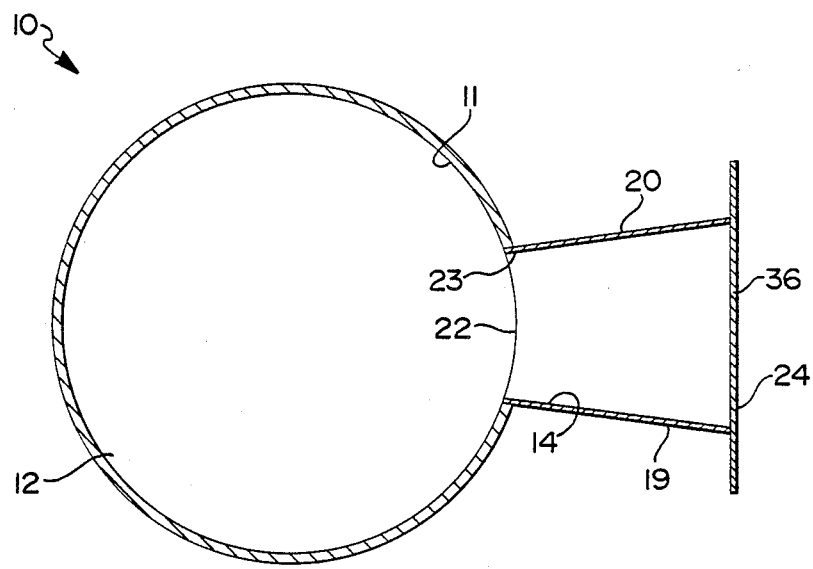
FIG. 2 is a top view of the cylinder assembly of FIG. 1.

Referring now to FIGS. 1 and 2 of the drawings in detail, numeral 10 generally indicates a two cycle internal combustion engine having a closed end cylinder 11 with a reciprocable piston 12 therein. The cylinder connects with an exhaust port 14, the opening and closing of which is controlled by the position of the upper edge 15 of the piston as it reciprocates downward and upward on its power and compression strokes.

The exhaust port 14 has side walls including an upper wall 16, a lower wall 18 and two opposite peripheral walls 19, 20 connecting the upper and lower walls. The side walls extend from an inlet 22 at the exhaust port opening 23 in the cylinder to an outlet 24 spaced outwardly from the inlet. The opposite peripheral walls 19, 20 diverge from one another in the direction of gas flow toward the outlet 24 to provide a diffusing configuration of increasing cross-sectional area of the port in the outward direction.

While the port shape as illustrated is of rectangular cross section, other port configurations, such as round, square or polygonal, for example, could equally well be utilized. Also, the upper and lower walls could additionally or alternatively be made diverging as desired to obtain the desired diffusion of the exhaust flow.

Presently, it is thought that a maximum divergence of about 15 degrees total included angle between the peripheral walls 19, 20 is preferred based on published test results for diffuser design. The port length is selected to obtain an outlet-to-inlet area ratio of 1.4 to 1 which represents a reasonable compromise between pressure recovery and space requirements for the passage.

Ideally, this configuration could recover almost 50 percent of the kinetic energy of the entering jet but 40 percent is more reasonable to expect due to flow distortions in the entering flow or caused by fluid friction. Unfortunately, this level of performance can only be accomplished when the port is wide open. Thus, when the piston uncovers only part of the total port area, as occurs initially during each blowdown, the entering fluid experiences a sudden enlargement, much like throttling, and very little pressure recovery may result. The foregoing examples are explanatory and are not limitive of the applications of the invention.

To improve blowdown performance, the exhaust port is further provided with a plurality of (in this case four) separator guide vanes 26–29 spaced axially of the cylinder. The vanes 26–29 are disposed between the upper and lower walls 16, 18 and extend between the port inlet 22 and outlet 24, thus dividing the port into a several (five in this illustration) diffusing exhaust passages 30–34.

As the number of vanes approaches infinity the effective inlet/outlet area ratio approaches a constant value. However, practical considerations will likely limit the number of vanes to three or four for automotive sized engines. The vanes may be equally spaced but it may be preferable as illustrated to make the spacing progressively larger toward the later opening (lower) portion of the port.

Optionally, a sliding guillotine type timing valve 36 may be provided at the exhaust port outlet to selectively cut off flow through the diffusing exhaust passages. The valve 36 is slidable downwardly from above the port to progressively cut off the passages beginning at the upper, or first opened, passage 30. In this way, the timing of the beginning of the exhaust blowdown flow is determined by the position of the timing valve 36.

In operation of an engine according to the invention, upward motion of the piston 12 cuts off flow through the exhaust port 14 and the inlet port, not shown. The charge is then compressed and ignited near the upper limit (top dead center position) of piston motion, fuel having been mixed with the air charge either before or after admission to the cylinder. The burned and burning combustion products are then expanded by downward motion of the piston until the exhaust process begins with a blowdown of pressurized gas into the upper portion of the exhaust port when the upper edge 15 of the piston passes the upper wall 16 of the port on the piston downstroke.

If the timing valve 36 is in its upper fully open position, the exhaust blowdown initially is directed through the upper exhaust passage 30, where efficient diffusion of the initial blowdown pulse takes place. As the piston continues downward, the exhaust flow is directed additionally into more of the passages as 30-31, 30-32, 30-33, and so forth. At each point, the flow expands into only that portion of the port having an area roughly equivalent to the area of the port opened by the piston. Thus, the expansion of the gas is controlled primarily by the flow rate and the angle of the diffusing walls and efficient expansion or diffusion of the exhaust gas with a substantial recovery of its dynamic energy is obtained.

If desired, the timing of the blowdown pulse may be delayed in order to obtain further expansion of the combustion products or gases until the piston reaches a lower position, such as at passage 31, 32 or 33. Such delayed timing may be desirable at part load, for example, to provide more efficient engine operation while at full load, the timing would necessarily be advanced to allow full scavenging and charging of the cylinder.

Figure 3:
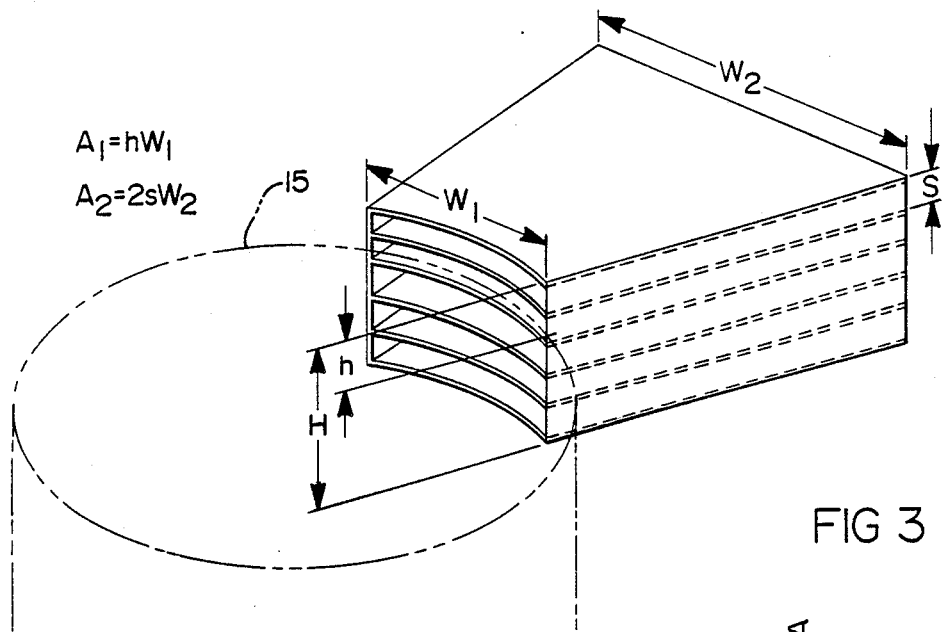
FIG. 3 is pictorial representation of a vaned exhaust port with generalized dimensions shown.
Figure 4:
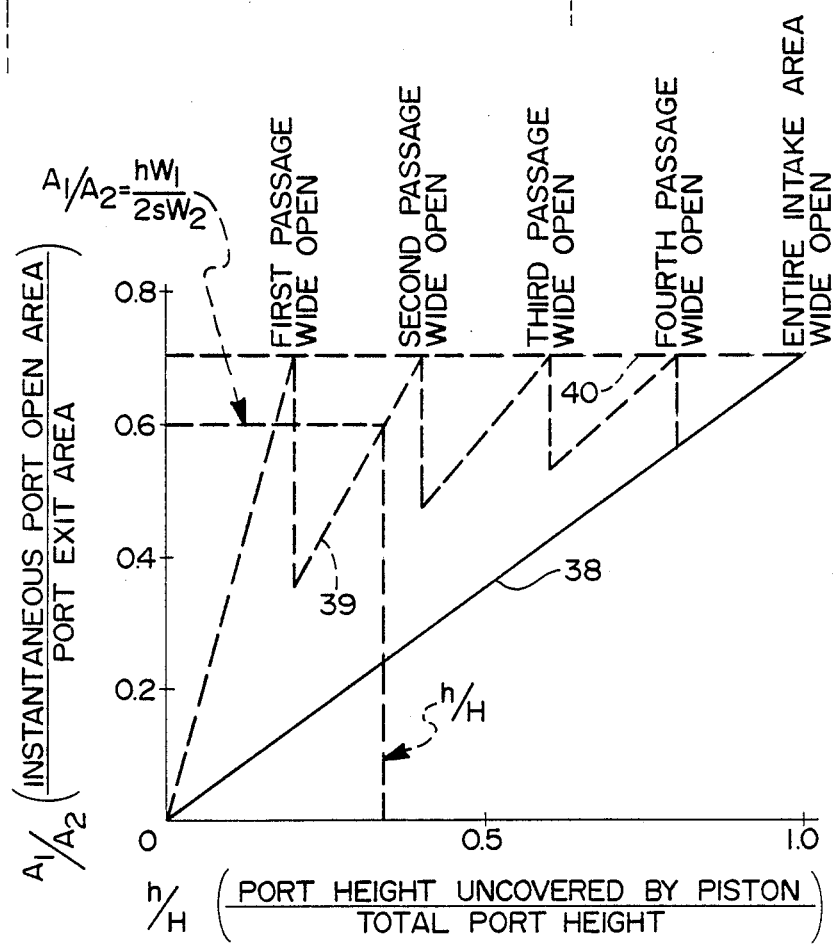
FIG. 4 is a graph comparing the instantaneous ratios of port open and exit areas at various port opening heights for vaned and unvaned exhaust ports.

FIGS. 3 and 4 illustrate the dimensional relationships and effects on the inlet/outlet area ratio of a divided exhaust port having equally sized and spaced exhaust passages according to the invention. In the port of FIG. 3 the various dimensions are identified as follows:

H = port height
s = individual passage height, equal in this case
h = open height (distance between the port upper wall 16 and the upper edge 15 of the piston)
v = number of open passages
$W_1$ = port width at inlet
$W_2$ = port width at outlet
$A_1 = hW_1$ open port inlet area
$A_2 = vsW_2$ open port outlet area
$A_1/A_2 = hW_1/vsW_2$ diffusion area ratio-inlet/outlet open area
h/H = port opening fraction In this illustration, the piston has opened two passages so v=2.

The graph of FIG. 4 plots the diffusion area ratio $A_1/A_2$ on the vertical axis against fractional port opening h/H on the horizontal axis for ports with and without separating vanes. The solid line 38 represents a conventional port without separating vanes in which the diffusion area ratio varies from zero to a maximum determined by the port design as the port is opened by the piston downstroke. Until the port is fully opened, the ejected exhaust gas experiences a sudden change in flow area as the gas passes through the restricted inlet opening into the full area of the exhaust port, so that efficiency is lost and little energy recovery is possible.

The dashed line 39 represents the port of FIG. 3 having four equally spaced separating vanes. In this case, the diffusion area ratio varies from zero to a maximum as the port is opened to the height of the upper exhaust passage. Further downward piston motion additionally opens the next lower passage partially reducing the diffusion area ratio which again increases to the maximum as the second passage becomes fully opened, and so forth.

It is apparent from this diagram that the diffusion area ratio will approach a constant design maximum 40 as the number of separating vanes is increased. Also, closer spacing of the upper vanes with variable spacing increasing toward the bottom of the exhaust port (as shown in FIG. 2) will raise the diffusion area ratio to its maximum at an earlier stage of the port opening, thereby increasing the port energy conversion efficiency during the important blowdown part of the exhaust process.

Delay of the exhaust timing by moving the timing valve 36 downward from its fully open position, will sequentially cut off flow through one or more of the exhaust passages. This will delay the beginning of the blowdown phase and allow less time for the full exhaust process but may increase the energy recovery in the port at part load when the gas through flow is lower.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

The embodiments of the invention in which an exclusive property or privilege is claimed are defined as follows:

1. A two cycle internal combustion engine having a cylinder with a piston reciprocable therein and at least one exhaust port opening through the cylinder between opposite ends thereof and opened and closed by reciprocating motion of the piston in the cylinder to control the passage of exhaust gas from the cylinder, said exhaust port having side walls extending from an inlet at said opening through the cylinder to an outlet spaced from the inlet and at least two opposite portions of said side walls diverging in the direction toward the outlet to provide increasing cross sectional area and diffusing gas flow in the port, and the improvement comprising
vane means in said port and dividing the flow path therethrough into a plurality of adjacent passages spaced axially of the cylinder so that they are serially opened by piston motion, at least the first opened of said passages being shaped as diffusers to provide substantial recovery of pressure from the blowdown of pressurized exhaust gases delivered to said port during engine operation.

2. An engine as in claim 1 and further comprising a timing valve adjustably movable across said port outlet and coacting with said vane means to serially block said passages from the first opened thereof to thereby vary the timing of the exhaust pulse by directing it through later opened passages.

3. A two cycle internal combustion engine having a cylinder with a piston reciprocable therein and at least one exhaust port opening through the cylinder between opposite ends thereof and opened and closed by reciprocating motion of the piston in the cylinder to control the passage of exhaust gas from the cylinder, said exhaust port having side walls extending from an inlet at said opening through the cylinder to an outlet spaced from the inlet and at least two opposite portions of said side walls diverging in the direction toward the outlet to provide increasing cross sectional area and diffusing gas flow in the port, and the improvement comprising
a plurality of vanes in said port and dividing the flow path therethrough into a plurality of adjacent passages spaced axially of the cylinder so that they are serially opened by piston motion, said passages having relatively small axial dimensions and common opposite side walls defining said diverging opposite portions which act as diffusers to provide substantial recovery of pressure from the blowdown of pressurized exhaust gases delivered to said port during engine operation.

4. An engine as in claim 3 and further comprising a timing valve adjustably movable across said port outlet and coacting with said vanes to serially block said passages from the first opened thereof to thereby vary the timing of the exhaust pulse by directing it through later opened passages.

* * * * *